(12) United States Patent
Sakai

(10) Patent No.: US 12,348,869 B2
(45) Date of Patent: Jul. 1, 2025

(54) LENS APPARATUS AND IMAGE PICKUP APPARATUS

(71) Applicant: CANON KABUSHIKI KAISHA, Tokyo (JP)

(72) Inventor: Hideki Sakai, Sakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/067,936

(22) Filed: Dec. 19, 2022

(65) Prior Publication Data

US 2023/0120733 A1    Apr. 20, 2023

Related U.S. Application Data

(63) Continuation of application No. 16/906,258, filed on Jun. 19, 2020, now Pat. No. 11,563,896.

(30) Foreign Application Priority Data

Jul. 3, 2019 (JP) .................. 2019-124649

(51) Int. Cl.
*G02B 15/163* (2006.01)
*G03B 3/10* (2021.01)
*H04N 23/69* (2023.01)

(52) U.S. Cl.
CPC ........... *H04N 23/69* (2023.01); *G02B 15/163* (2013.01); *G03B 3/10* (2013.01)

(58) Field of Classification Search
CPC ...... H04N 23/69; H04N 23/663; H04N 23/81; H04N 23/651; H04N 5/23296; H04N 5/23212; H04N 5/23209; H04N 5/262; H04N 5/23206; G02B 15/163; G02B 15/16; G02B 7/10; G02B 7/102; G02B 7/28; G02B 7/282; G03B 3/10; G03B 2205/0046; G03B 7/20; G03B 7/08; G03B 5/00; G03B 17/00; G03B 17/36
USPC ........... 250/208.1, 201.2, 200; 359/676, 682, 359/684, 687, 689, 699; 396/80–82
See application file for complete search history.

(56) References Cited

U.S. PATENT DOCUMENTS

| | | | |
|---|---|---|---|
| 11,399,128 B2 | 7/2022 | Ito | |
| 11,563,896 B2 * | 1/2023 | Sakai | G02B 15/163 |
| 2002/0041334 A1 | 4/2002 | Okawara | |
| 2010/0309342 A1 * | 12/2010 | Nagata | H04N 23/663 |
| | | | 348/241 |

(Continued)

FOREIGN PATENT DOCUMENTS

JP    2013123121 A    6/2013

OTHER PUBLICATIONS

Office Action issued in U.S. Appl. No. 16/906,258 mailed May 9, 2022.

(Continued)

*Primary Examiner* — Jie Lei
(74) *Attorney, Agent, or Firm* — ROSSI, KIMMS & McDOWELL LLP

(57) ABSTRACT

A lens apparatus includes an operation member that is rotatable by a user operation, a zoom lens configured to perform zooming in accordance with a rotation of the operating member, and a detector configured to divide an entire zoom range from a wide-angle end to a telephoto end, and detect a zoom position of the zoom lens. A predetermined condition is satisfied.

10 Claims, 7 Drawing Sheets

(56) References Cited

U.S. PATENT DOCUMENTS

2013/0308932 A1  11/2013  Nagao

OTHER PUBLICATIONS

Notice of Allowance issued in U.S. Appl. No. 16/906,258 mailed Oct. 13, 2022.

* cited by examiner

LENS APPARATUS AND IMAGE PICKUP APPARATUS

BACKGROUND OF THE INVENTION

Field of the Invention

The present invention relates to a lens apparatus used for an image pickup apparatus, such as a digital camera and a digital video camera.

Description of the Related Art

It is necessary for proper image processing such as a distortion correction, to accurately transmit positional information of a lens apparatus to an image pickup apparatus. Particularly in the case of a zoom lens, the distortion aberration greatly changes depending on the zoom position and it is thus important to detect the zoom position information with high accuracy. Japanese Patent Laid-Open No. ("JP") 2013-123121 discloses a method of complementarily generating correction data in order to suppress discontinuous changes in image processing when the lens position changes.

However, in the method disclosed in JP 2013-123121, a delay occurs when the correction data is switched and the processing may shift or delay. The complementary processing of the correction data is required in the camera, and the effect cannot be obtained in a camera that does not support the complementary processing.

On the other hand, if a high-resolution detecting unit is installed inside the lens apparatus in order to improve the zoom position detecting resolution, the cost and size of the installation space will increase, making the lens apparatus expensive and large.

SUMMARY OF THE INVENTION

The present invention provides a lens apparatus and an image pickup apparatus, each of which is inexpensive and compact and can improve the zoom position detecting resolution.

A lens apparatus according to one aspect of the present invention includes an operation member that is rotatable by a user operation, a zoom lens configured to perform zooming in accordance with a rotation of the operating member, and a detector configured to divide an entire zoom range from a wide-angle end to a telephoto end, and detect a zoom position of the zoom lens. In a zoom range that satisfies the following condition:

$$Dist < -8.0,$$

The following conditional expression is satisfied:

$$(N \times \Delta\theta)/\theta < 0.50,$$

where Dist (%) is a distortion amount of the zoom lens, N is a maximum number of divisions of the entire zoom range by the detector, θ (degree) is a total rotational angle of the operation member in the entire zoom range, and Δθ (degree) is a rotational angle of the operating member corresponding to a minimum resolution of the detector.

An image pickup apparatus according to another aspect of the present invention includes the above lens apparatus, and an image sensor configured to receive light from the lens apparatus.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

Figure 1:
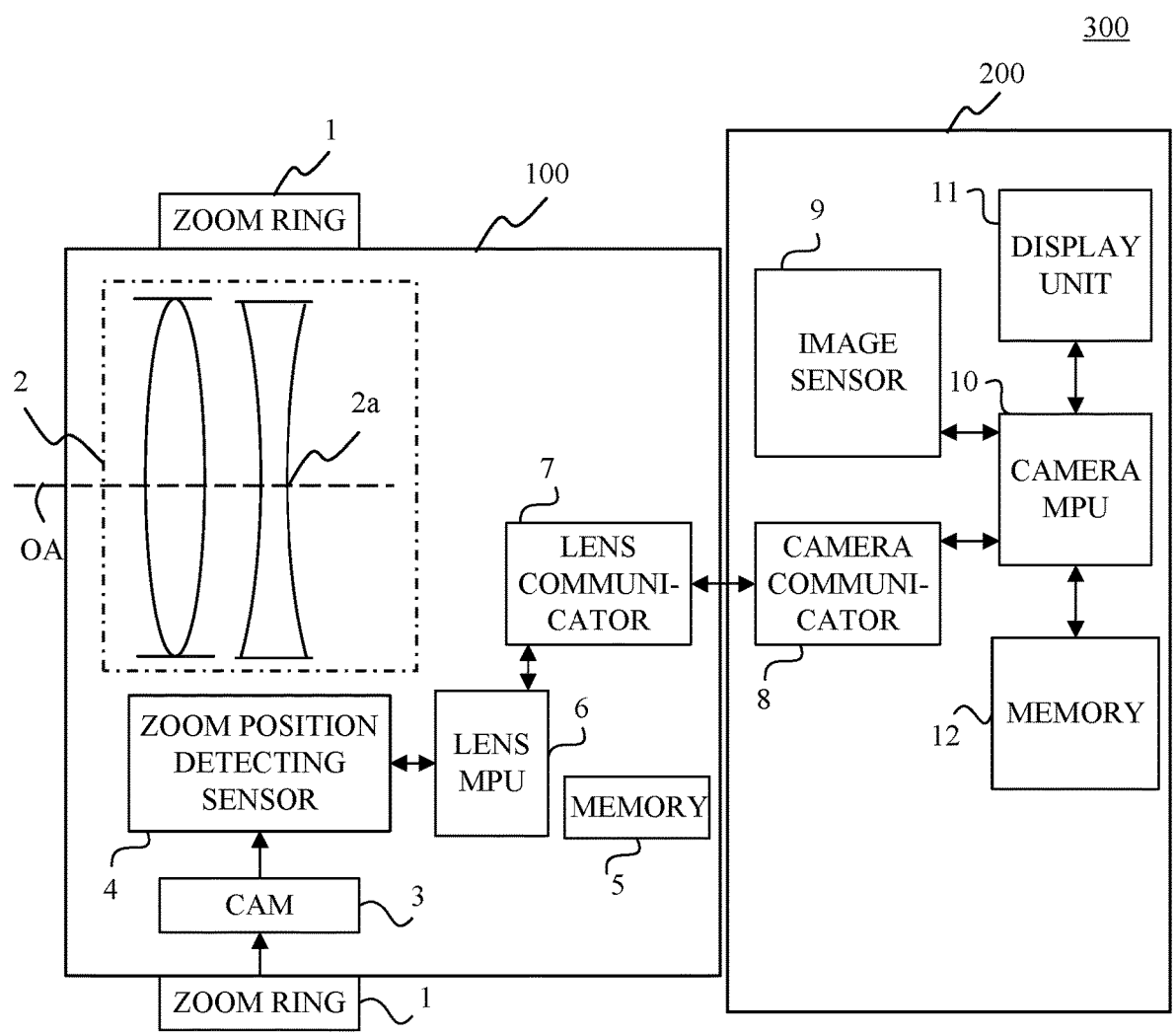
FIG. 1 is a block diagram of an image pickup apparatus according to each embodiment.

A description will now be given of an image pickup apparatus according to this embodiment. FIG. 1 is a block diagram of an image pickup apparatus (image pickup system) 300. The image pickup apparatus 300 includes an image pickup apparatus body (camera body) 200 and a lens apparatus (interchangeable lens) 100 that can be attached to and detached from the image pickup apparatus body 200. However, this embodiment is not limited to this embodiment, and is also applicable to an image pickup apparatus in which the image pickup apparatus body and the lens apparatus are integrated with each other.

The lens apparatus 100 includes a zoom ring (operation member) 1, a lens unit (image pickup optical system) 2, a cam (driving mechanism) 3, a zoom position detecting sensor (detector) 4, a memory 5, and a lens MPU (controller) 6, and a lens communicator 7. The image pickup apparatus body 200 includes a camera communicator 8, an image sensor 9, a camera MPU (controller) 10, a display unit 11, and a memory 12.

The zoom ring 1 is an operation member that can be (manually) operated by the user for zooming. The lens unit 2 is a zoom lens that forms an object image on an image pickup plane of the image sensor 9. In accordance with the (rotational) operation of the zoom ring 1, the arrangement of the lenses forming the lens unit 2 changes and zooming is performed. A lens 2a included in the lens unit 2 moves in the direction along the optical axis OA (optical axis direction) during zooming. The cam 3 is a driving mechanism for converting the rotational driving of the zoom ring 1 into the linear driving of the lens 2a. The memory 5 stores aberration correction information of the lens unit 2.

The lens MPU 6 acquires aberration correction information from the memory 5 and sends it to the camera MPU 10 via the lens communicator 7 and the camera communicator 8. The lens MPU 6 also transmits information indicating the current zoom position to the camera MPU 10 via the lens communicator 7 and the camera communicator 8. The information indicating the current zoom position is determined based on the output signal from the zoom position detecting sensor 4 that detects the zoom position, and is information indicating which position of the entire zoom range the current zoom position is.

The zoom position detecting sensor 4 and detects a moving amount (a linear driving amount) of the lens 2a, and outputs a signal corresponding to a value indicating, for example, the position when the entire zoom range is divided into N equal parts. In this embodiment, the shape of the cam groove of the cam 3 is designed so that the relationship between the rotational operation of the zoom ring 1 and the output signal of the zoom position detecting sensor 4 satisfies a predetermined conditional expression.

The image sensor 9 has a CMOS sensor or a CCD sensor, and photoelectrically converts an optical image (object image) formed via the lens unit 2 to output the image data (captured image). The camera MPU 10 corrects the aberration of the captured image using the aberration correction information corresponding to the current zoom position among the aberration correction information acquired from the lens MPU 6. At least, the distortion aberration (also simply referred to as "distortion" hereinafter) is corrected. Then, the camera MPU 10 displays the corrected image on the display unit 11 or stores the corrected image in the memory 12.

Referring now to FIGS. 2 to 13, a description will be given of the lens apparatus 100 according to each embodiment. It is necessary for proper image processing such as the distortion correction to accurately transmit the zoom position in the lens apparatus 100 to the image pickup apparatus body 200. Particularly, when the lens 2a is directly moved via the cam 3 by rotating the zoom ring 1, the zoom operation can be performed at a high or low speed depending on the operation of the zoom ring 1. When the zoom operation is performed at a high speed, the detection accuracy of the zoom position (zoom position information) of the lens apparatus 100 is insufficient and the distortion change is significant, the correction value for the image processing such as the distortion correction is not smoothly switched and the aberration may stand out particularly in video recording. Accordingly, this embodiment properly sets the zoom position detecting resolution per unit rotational angle of the zoom ring 1 around the zoom position where the distortion amount change of the zoom lens 2 is large in the entire zoom range.

Figure 2:
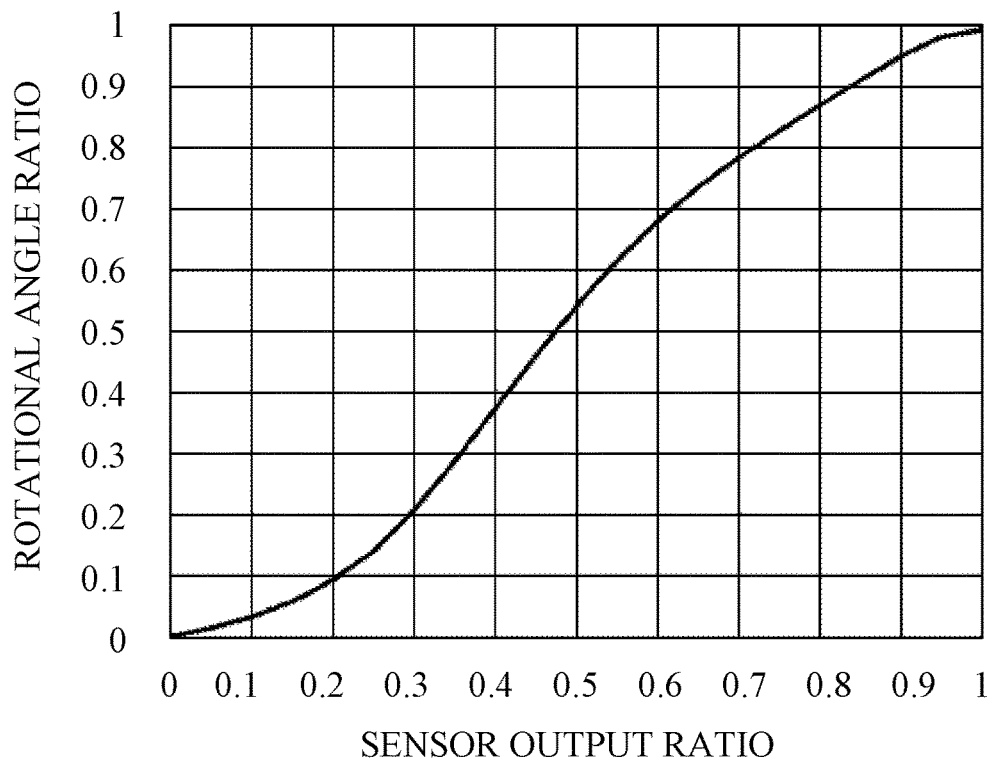
FIG. 2 is a graph illustrating a relationship between a sensor output ratio and a rotational angle ratio according to a first embodiment.

FIG. 2 is a graph illustrating a relationship between a sensor output ratio indicating the ratio of the output value of the zoom position detecting sensor 4 to the maximum number of divisions N of the entire zoom range by the zoom position detecting sensor 4 according to the first embodiment, and a rotational angle ratio indicating a rotational angle of the zoom ring 1 relative to the total rotational angle of the zoom ring 1. In FIG. 2, the abscissa axis represents the sensor output ratio and the ordinate axis represents the rotational angle ratio. As illustrated in FIG. 2, in an area where the sensor output ratio is nearly 0, the sensor output ratio is larger than the rotational angle ratio.

Figure 3:
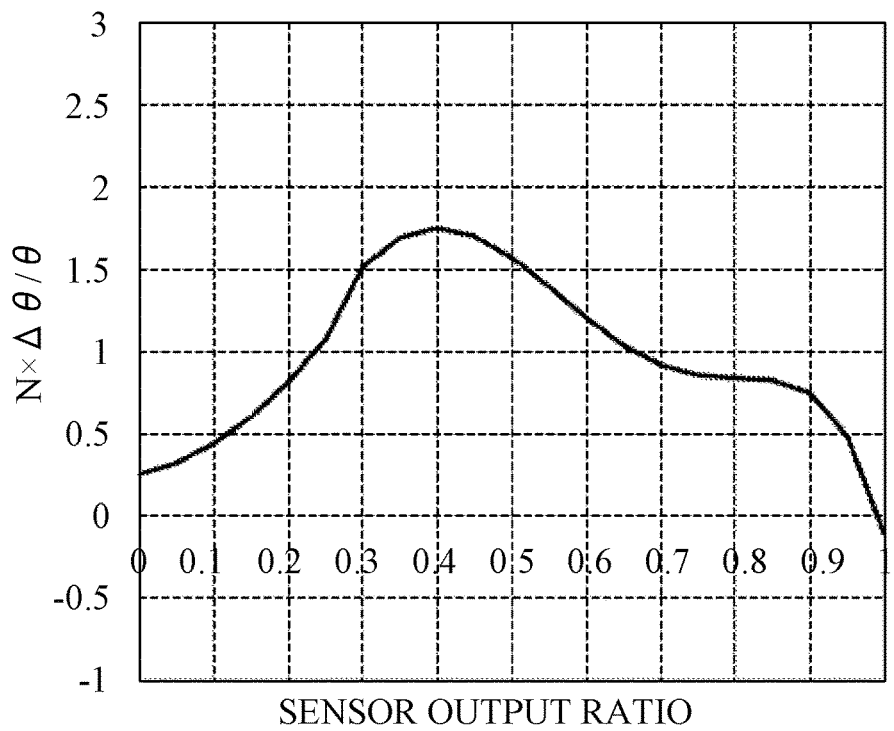
FIG. 3 is a graph illustrating a relationship between the sensor output ratio and a value of $N \times \Delta\theta/\theta$ according to the first embodiment.

FIG. 3 is a graph illustrating a relationship between the sensor output ratio and a value of $N \times \Delta\theta/\theta$ according to the first embodiment. Herein, N denotes the maximum number of divisions of the entire zoom range by the detector (the maximum number of divisions of the zoom position detecting sensor 4 in the entire zoom range from the wide-angle end to the telephoto end), $\theta$ (degree) denotes the total rotational angle of the zoom ring 1, and $\Delta\theta$ (degree) denotes the rotational angle of the zoom ring 1 corresponding to the minimum resolution of the zoom position detecting sensor 4 at each zoom position. "×" means a multiplication. In FIG. 3, the abscissa axis represents the sensor output ratio and the ordinate axis represents the value of $N \times \Delta\theta/\theta$.

Figure 4:
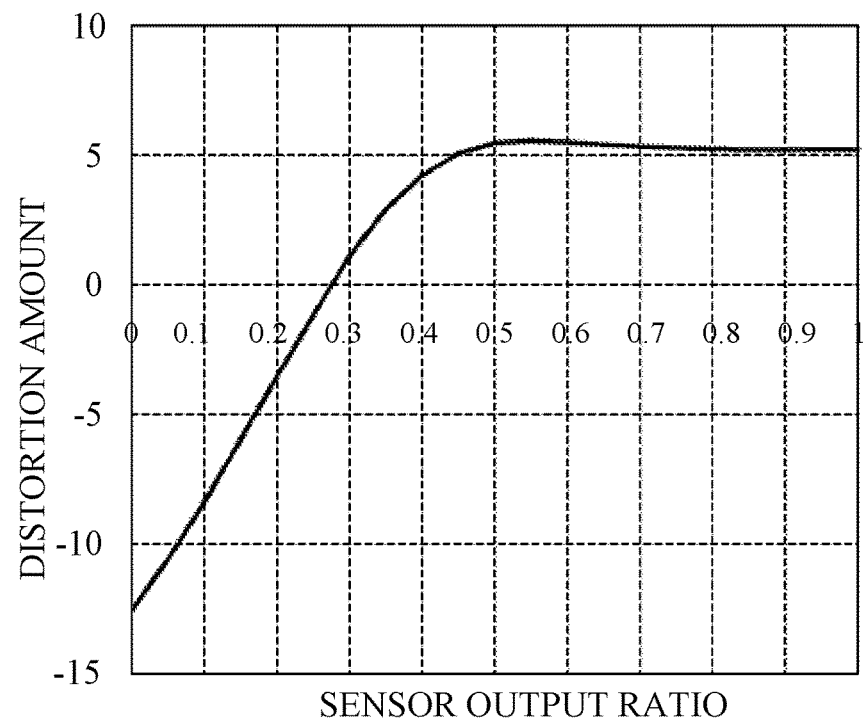
FIG. 4 is a graph illustrating a relationship between the sensor output ratio and a distortion amount according to the first embodiment.

FIG. 4 is a graph illustrating a relationship between the sensor output ratio and a distortion amount Dist (%) according to the first embodiment. In FIG. 4, the abscissa axis represents the sensor output ratio and the ordinate axis represents the distortion amount. The lens apparatus 100 according to this embodiment satisfies the following conditional expression (2) in the zoom range (zoom position) having the distortion amount Dist (%) that satisfies the following conditional expression (1).

$$\text{Dist} < -8.0 \qquad (1)$$

$$(N \times \Delta\theta)/\theta < 0.50 \qquad (2)$$

The conditional expressions (1) and (2) indicate that the zoom position detecting resolution improves in the negative distortion range where the distortion change amount tends to be relatively large. The range of conditional expression (1) is often located on the wide-angle end side of the zoom lens.

The conditional expression (1) defines the distortion amount (%). By satisfying the conditional expression (1), it becomes unnecessary to correct the negative distortion aberration only by the lens system. The number of lenses that is disposed on the object side for the distortion correction and is likely to have a large lens diameter can be reduced. On the other hand, when the distortion amount is set within the range of the conditional expression (1), the absolute value of the distortion amount is large, so that the distortion change amount during the zoom operation is likely to be large. The conditional expression (2) represents the relationship of the rotational angle corresponding to the minimum resolution of the zoom position detecting sensor 4. By satisfying the conditional expression (2), the zoom position can be detected with high accuracy because the sensor output ratio per rotational angle can be made larger (or the detection resolution can be more improved) than that where the relationship between the rotational angle ratio and the sensor output ratio is proportional.

Figure 5:
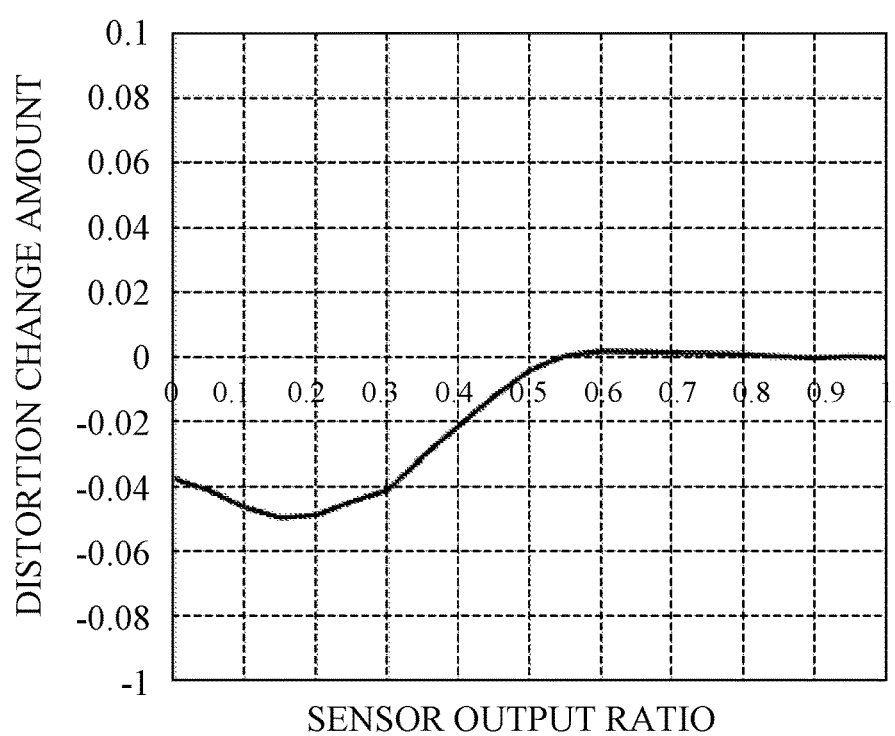
FIG. 5 is a graph illustrating a relationship between the sensor output ratio and the distortion amount change according to the first embodiment.

FIG. 5 is a graph illustrating a relationship between the sensor output ratio and the distortion amount change. In FIG. 5, the abscissa axis represents the sensor output ratio and the ordinate axis represents the distortion change amount. As illustrated in FIG. 5, the distortion change is suppressed small in a region where the distortion amount is large. Thereby, even when the zoom operation is performed under the condition that the distortion change is large, the correction value for the image processing such as the distortion correction can be switched accurately and smoothly.

The following conditional expression (2a) may be satisfied in the zoom range of the distortion amount Dist (%) that satisfies the following conditional expression (1a).

$$\text{Dist} < -9.0 \tag{1a}$$

$$(N \times \Delta\theta)/\theta < 0.45 \tag{2a}$$

The following conditional expression (2b) may be satisfied in the zoom range of the distortion amount Dist (%) that satisfies the following conditional expression (1b).

$$\text{Dist} < -10.0 \tag{1b}$$

$$(N \times \Delta\theta)/\theta < 0.40 \tag{2b}$$

In this embodiment, at least one of the following conditional expressions (3) to (5) may be satisfied.

$$|\text{Dist}A - \text{Dist}B| < 0.08 \tag{3}$$

$$N < 1100 \tag{4}$$

$$\theta > 55 \tag{5}$$

In the conditional expression (3), DistA denotes a distortion amount before the operation of the zoom ring 1 corresponding to the minimum resolution of the zoom position detecting sensor 4, and DistB denotes a distortion amount after the operation. In the lens apparatus 100, the conditional expression (3) is satisfied in the entire zoom range. The conditional expression (3) defines the distortion change amount per minimum resolution of the zoom position detecting sensor 4. By satisfying the conditional expression (3), the change amount when the correction value such as the distortion correction is switched becomes small, and the aberration can be smoothly corrected regardless of the operation speed of the zoom ring 1. When the value exceeds the upper limit of the conditional expression (3), it becomes difficult to perform this smooth aberration correction.

The conditional expression (4) defines the maximum number of divisions N of the zoom position detecting sensor 4 from the wide-angle end to the telephoto end. When the value becomes higher than the upper limit of the conditional expression (4), the cost of the zoom position detecting sensor 4 and the installation space increase, which leads to an increase in cost and size of the lens apparatus 100.

The conditional expression (5) defines the total rotational angle of the zoom ring 1 from the wide-angle end to the telephoto end. When the value becomes lower than the lower limit of the conditional expression (5), the total rotational angle of the zoom ring 1 is small, so that the zoom position change amount per change in the unit rotational angle of the zoom ring 1 becomes large, and smooth zooming operation becomes difficult.

The numerical ranges of conditional expressions (3) to (5) may be set as in the following conditional expressions (3a) to (5a), respectively.

$$|\text{Dist}A - \text{Dist}B| < 0.07 \tag{3a}$$

$$N < 1050 \tag{4a}$$

$$\theta > 75 \tag{5a}$$

The numerical ranges of the conditional expressions (3a) to (5a) may be set as the following conditional expressions (3b) to (5b), respectively.

$$|\text{Dist}A - \text{Dist}B| < 0.05 \tag{3b}$$

$$N < 1010 \tag{4b}$$

$$\theta > 95 \tag{5b}$$

The following conditional expression (7) may be satisfied in the zoom range of the distortion amount Dist (%) which satisfies the following conditional expression (6).

$$\text{Dist} > 4.0 \tag{6}$$

$$(N \times \Delta\theta)/\theta < 0.90 \tag{7}$$

The conditional expression (6) defines the distortion amount. Satisfying the conditional expression (6) enables the design that allows the positive distortion, and thus it becomes easy to shorten the total length of the lens unit (zoom lens) 2 especially in the telephoto range and to shorten the focal length of each unit. On the other hand, when the positive distortion is corrected by the image processing, it is necessary to perform processing that extends the central portion in the image relative to the periphery of the image and thus the correction error is likely to stand out.

The conditional expression (7) represents the relationship of the rotational angle corresponding to the minimum resolution of the zoom position detecting sensor 4. By satisfying the conditional expression (7), it becomes possible to detect the zoom position more accurately by increasing the sensor output ratio per rotational angle than that where the relationship between the rotational angle ratio and the sensor output ratio is proportional, and thus the image processing (electronic aberration correction) can be properly made such as the distortion correction. When the value is higher than the upper limit of the conditional expression (7), it becomes difficult to properly perform the image processing (electronic aberration correction).

Figure 6:
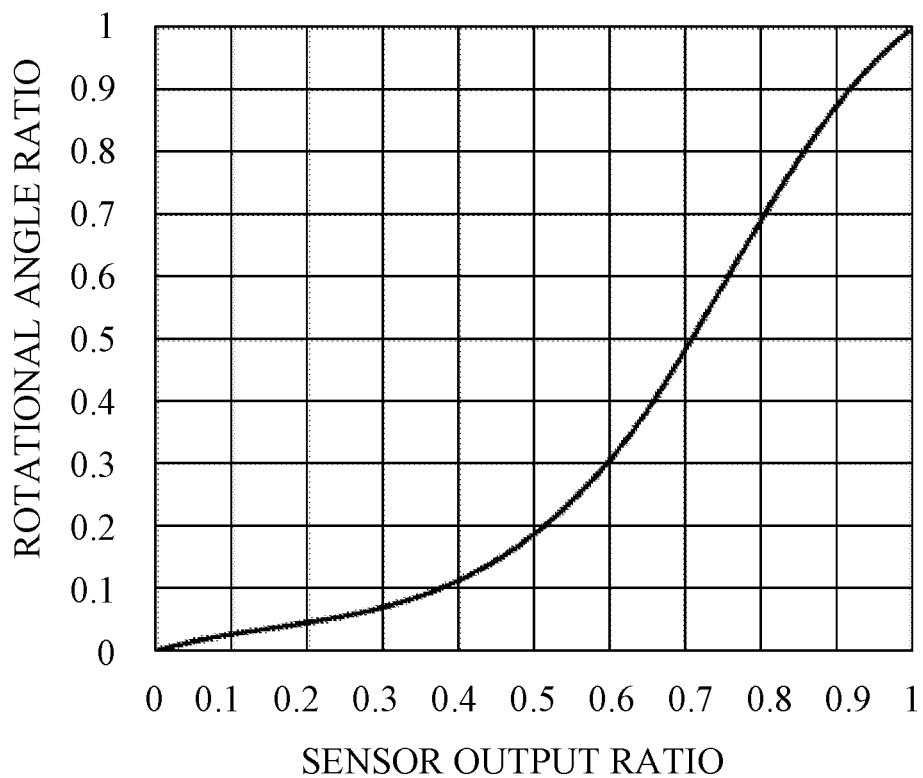
FIG. 6 is a graph illustrating a relationship between a sensor output ratio and a rotational angle ratio according to a second embodiment.
Figure 7:
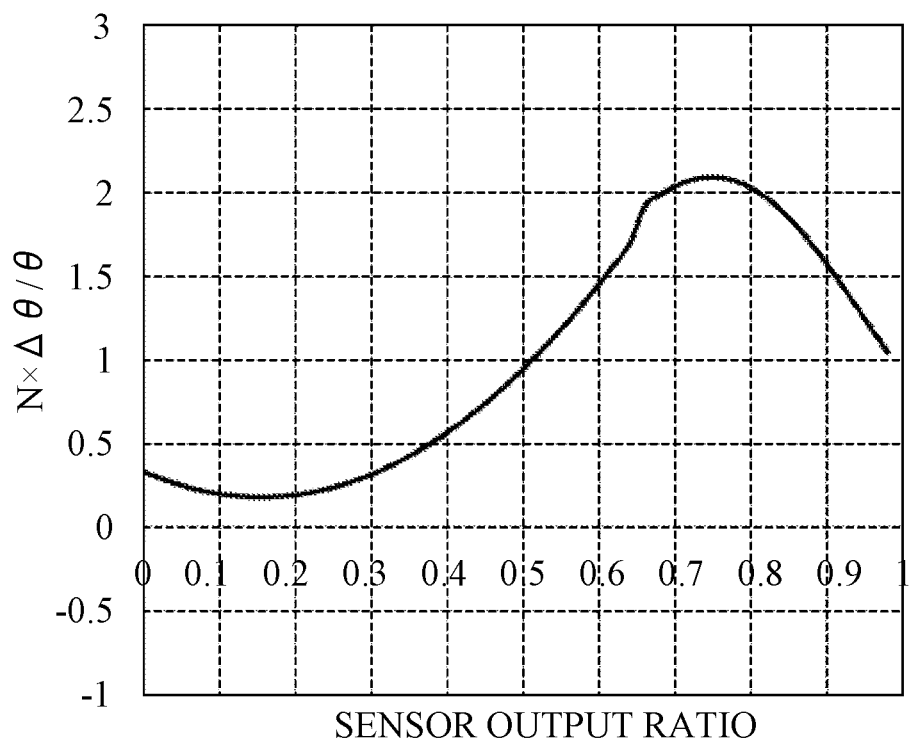
FIG. 7 is a graph illustrating a relationship between the sensor output ratio and a value of $N \times \Delta\theta/\theta$ according to the second embodiment.
Figure 8:
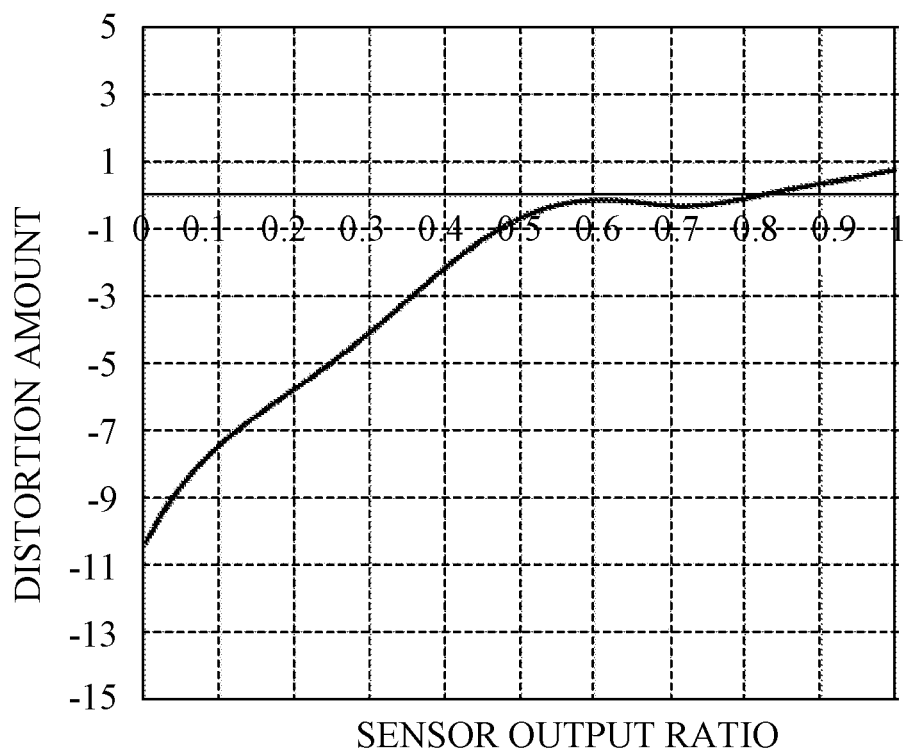
FIG. 8 is a graph illustrating a relationship between the sensor output ratio and a distortion amount according to the second embodiment.
Figure 9:
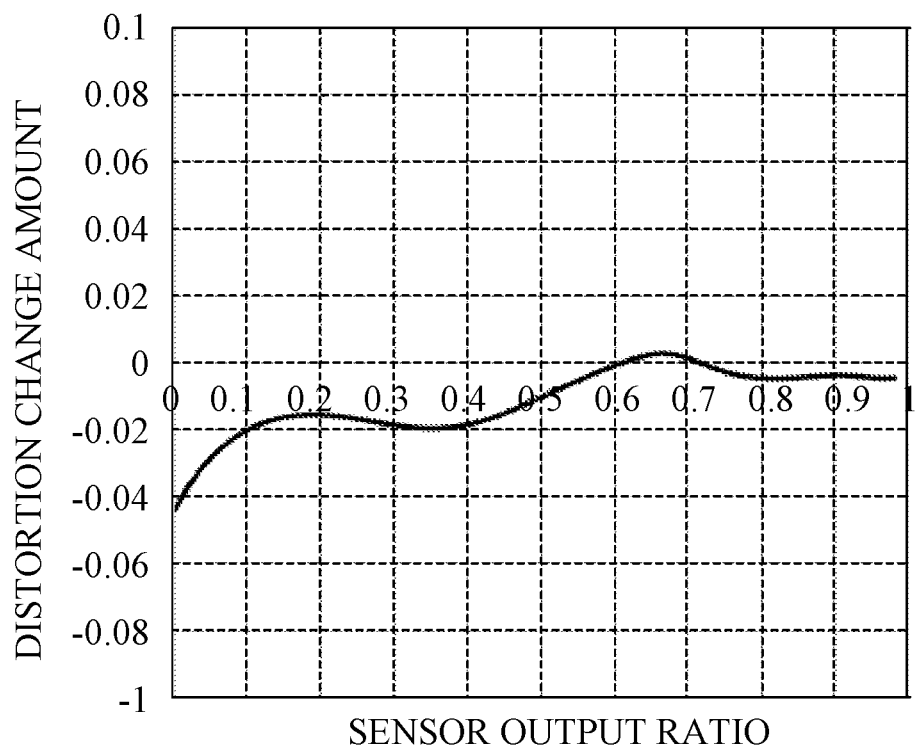
FIG. 9 is a graph illustrating a relationship between the sensor output ratio and a distortion amount change according to the second embodiment.

FIG. 6 is a graph illustrating a relationship between the sensor output ratio and the rotational angle ratio according to a second embodiment. FIG. 7 is a graph illustrating a relationship between the sensor output ratio and the value of N×Δθ/θ according to the second embodiment. FIG. 8 is a graph illustrating a relationship between the sensor output ratio and the distortion amount according to the second embodiment. FIG. 9 is a graph illustrating the relationship between the sensor output ratio and the distortion amount change according to the second embodiment.

Figure 10:
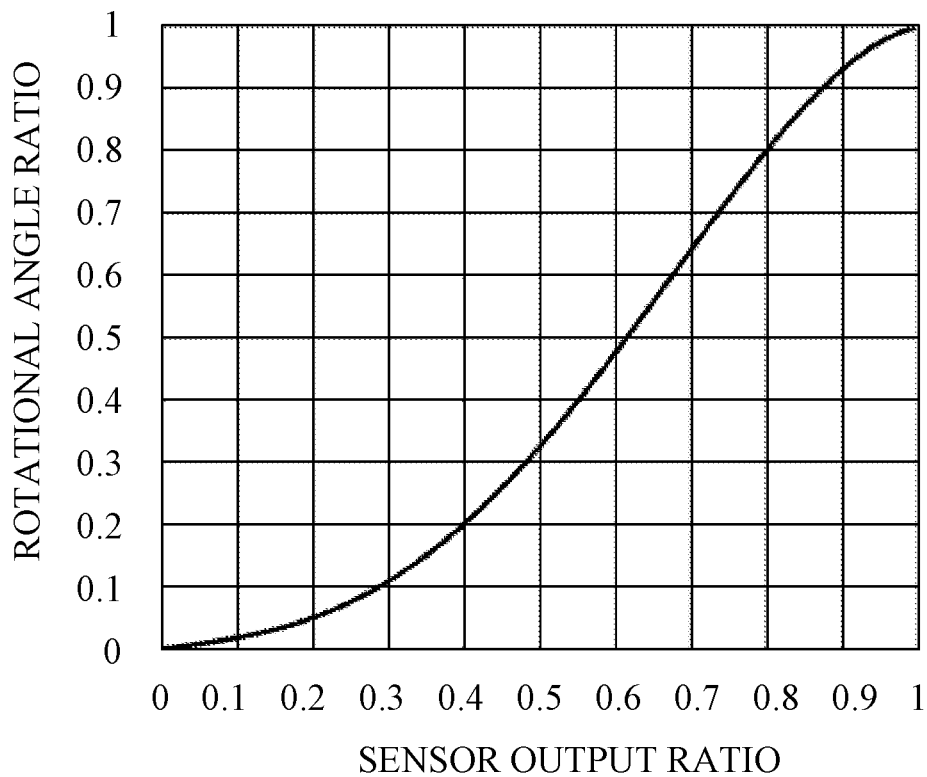
FIG. 10 is a graph illustrating the relationship between the sensor output ratio and a rotational angle ratio according to a third embodiment.
Figure 11:
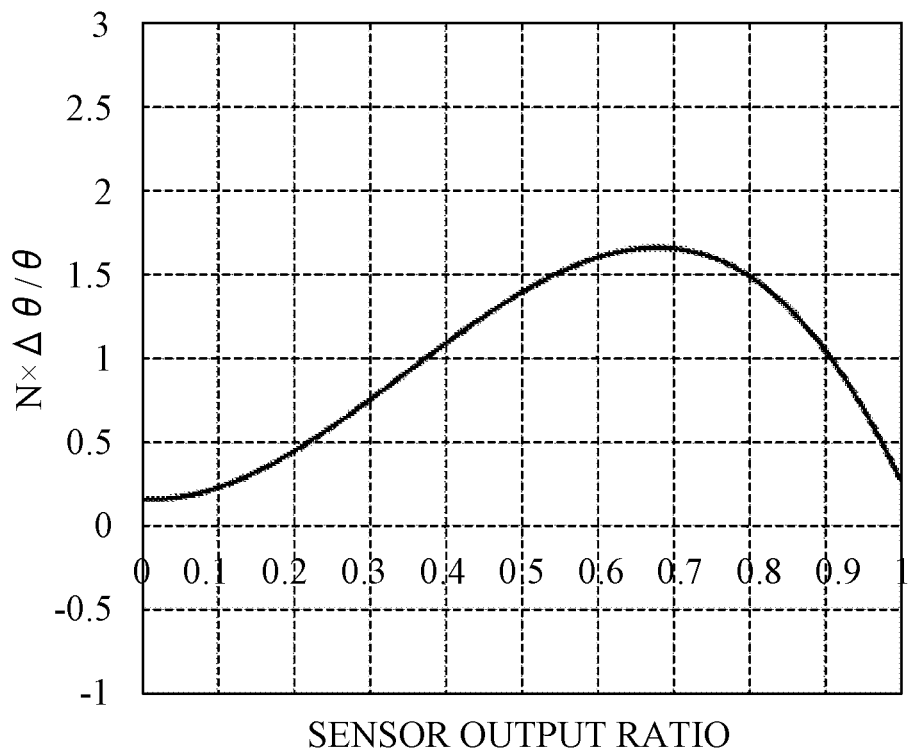
FIG. 11 is a graph illustrating the relationship between the sensor output ratio and a value of $N \times \Delta\theta/\theta$ according to the third embodiment.
Figure 12:
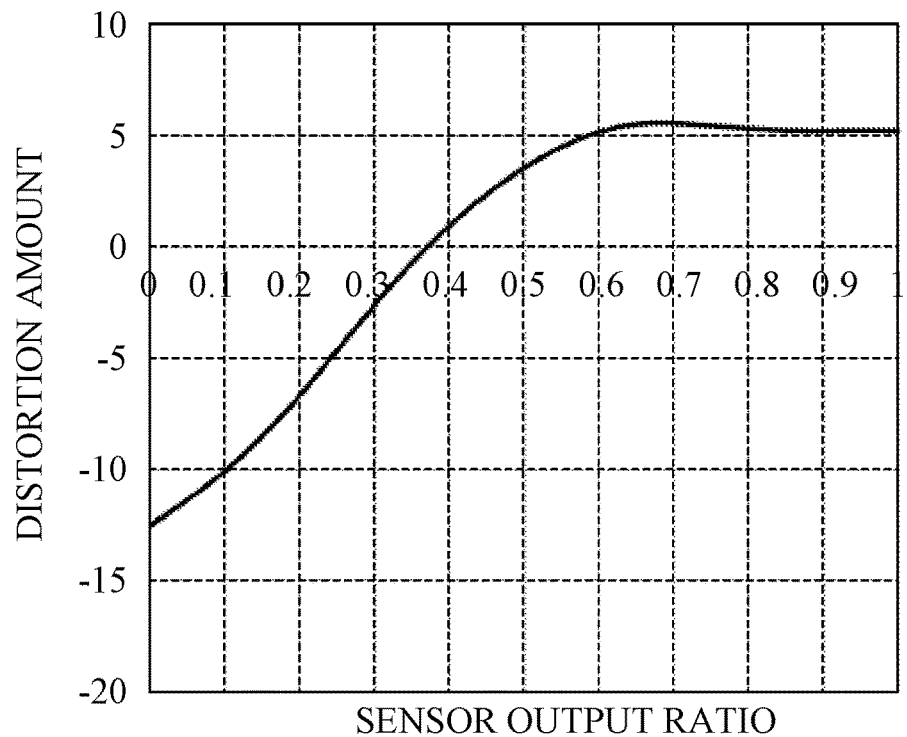
FIG. 12 is a graph illustrating a relationship between the sensor output ratio and a distortion amount according to the third embodiment.
Figure 13:
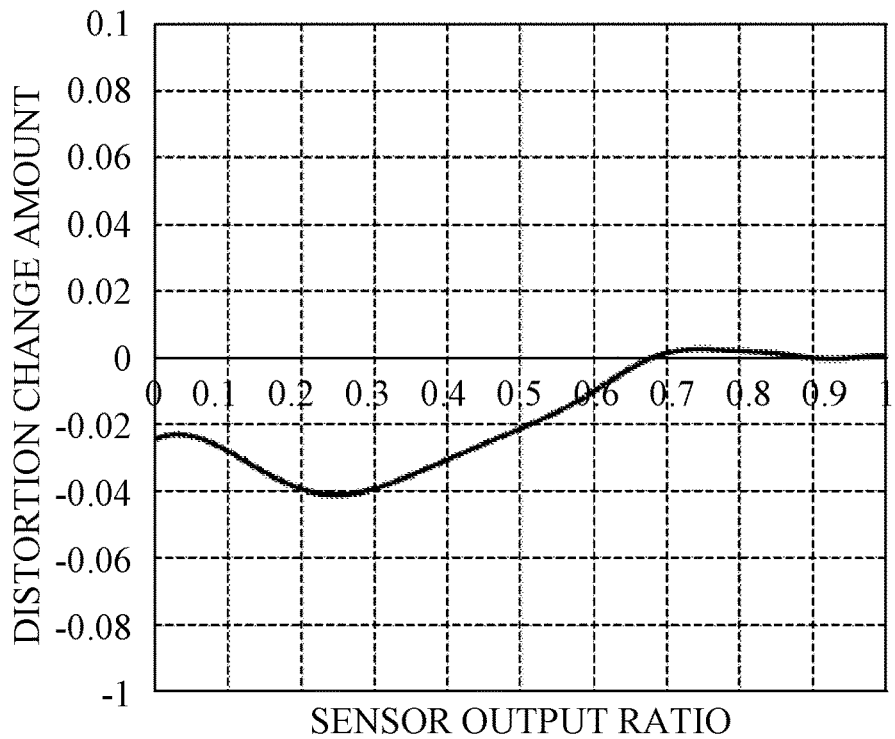
FIG. 13 is a graph illustrating a relationship between the sensor output ratio and a distortion amount change according to the third embodiment.

FIG. 10 is a graph illustrating a relationship between the sensor output ratio and the rotational angle ratio according to a third embodiment. FIG. 11 is a graph illustrating the relationship between the sensor output ratio and the value of N×Δθ/θ according to the third embodiment. FIG. 12 is a graph illustrating the relationship between the sensor output ratio and the distortion amount according to the third embodiment. FIG. 13 is a graph illustrating the relationship between the sensor output ratio and the distortion amount change according to the third embodiment.

Tables 1 to 3 show the total rotational angle θ, the distortion amount Dist, the value DistA−DistB of the conditional expression (3), and the value N×Δθ/θ of the conditional expression (2) for the respective sensor outputs according to the first to third embodiments.

Each of the embodiments shows that the zoom position detecting resolution is improved in the range of the negative distortion aberration in which the distortion aberration change amount is likely to be relatively large.

Each embodiment can provide a lens apparatus and an image pickup apparatus, each of which is inexpensive and compact and can improve the zoom position detecting resolution.

In each embodiment, the memory 5 may store the aberration information of the lens unit 2 instead of the aberration correction information of the lens unit 2, for example. When the information stored in the memory 5 is the aberration information, the image pickup apparatus body 200 can correct the captured image so as to reduce the aberration.

TABLE 1

| Sensor output | θ | Dist | DistA−DistB | N × Δθ/θ |
| --- | --- | --- | --- | --- |
| 0 | 0.000 | −12.531 | −0.038 | 0.247 |
| 1 | 0.025 | −12.483 | −0.038 | 0.248 |
| 2 | 0.049 | −12.456 | −0.038 | 0.248 |
| 3 | 0.074 | −12.418 | −0.038 | 0.249 |
| 4 | 0.100 | −12.380 | −0.038 | 0.250 |
| 5 | 0.125 | −12.343 | −0.038 | 0.251 |
| ~ | ~ | ~ | ~ | ~ |
| 60 | 1.721 | −10.150 | −0.043 | 0.337 |
| 61 | 1.755 | −10.108 | −0.043 | 0.339 |
| 62 | 1.789 | −10.065 | −0.043 | 0.341 |
| 63 | 1.823 | −10.022 | −0.043 | 0.343 |
| 64 | 1.858 | −9.980 | −0.043 | 0.345 |
| 65 | 1.893 | −9.937 | −0.043 | 0.347 |
| ~ | ~ | ~ | ~ | ~ |
| 105 | 3.480 | −8.134 | −0.047 | 0.449 |
| 106 | 3.525 | −8.086 | −0.047 | 0.452 |
| 107 | 3.570 | −8.039 | −0.047 | 0.455 |
| 108 | 3.616 | −7.992 | −0.047 | 0.458 |
| 109 | 3.662 | −7.945 | −0.047 | 0.461 |
| 110 | 3.708 | −7.897 | −0.047 | 0.464 |
| ~ | ~ | ~ | ~ | ~ |
| 995 | 100.039 | 5.234 | 0.000 | −0.046 |
| 996 | 100.035 | 5.234 | 0.000 | −0.061 |
| 997 | 100.028 | 5.234 | 0.000 | −0.077 |
| 998 | 100.021 | 5.234 | 0.000 | −0.094 |
| 999 | 100.011 | 5.234 | 0.000 | −0.110 |
| 1000 | 100.000 | 5.235 | | |

TABLE 2

| Sensor output | θ | Dist | DistA−DistB | N × Δθ/θ |
| --- | --- | --- | --- | --- |
| 0 | 0.000 | −10.408 | −0.044 | 0.334 |
| 1 | 0.020 | −10.364 | −0.043 | 0.332 |
| 2 | 0.040 | −10.321 | −0.043 | 0.330 |
| 3 | 0.060 | −10.278 | −0.043 | 0.328 |
| 4 | 0.079 | −10.235 | −0.042 | 0.326 |
| 5 | 0.099 | −10.193 | −0.042 | 0.324 |
| 6 | 0.118 | −10.151 | −0.041 | 0.322 |
| 7 | 0.138 | −10.110 | −0.041 | 0.321 |
| 8 | 0.157 | −10.068 | −0.041 | 0.319 |
| 9 | 0.176 | −10.028 | −0.040 | 0.317 |
| 10 | 0.195 | −9.987 | −0.040 | 0.315 |
| ~ | ~ | ~ | ~ | ~ |
| 70 | 1.160 | −8.107 | −0.024 | 0.227 |
| 71 | 1.174 | −8.083 | −0.024 | 0.226 |
| 72 | 1.187 | −8.059 | −0.024 | 0.225 |
| 73 | 1.201 | −8.035 | −0.024 | 0.224 |
| 74 | 1.214 | −8.011 | −0.024 | 0.223 |
| 75 | 1.228 | −7.988 | −0.023 | 0.222 |
| ~ | ~ | ~ | ~ | ~ |
| 995 | 59.715 | 0.753 | −0.004 | 0.961 |
| 996 | 59.773 | 0.757 | −0.004 | 0.956 |
| 997 | 59.830 | 0.761 | −0.004 | 0.950 |
| 998 | 59.887 | 0.764 | −0.004 | 0.944 |
| 999 | 59.944 | 0.768 | −0.004 | 0.939 |
| 1000 | 60.000 | 0.772 | | |

TABLE 3

| Sensor output | θ | Dist | DistA−DistB | N × Δθ/θ |
| --- | --- | --- | --- | --- |
| 0 | 0.000 | −12.531 | −0.025 | 0.161 |
| 1 | 0.016 | −12.507 | −0.024 | 0.161 |
| 2 | 0.032 | −12.482 | −0.024 | 0.160 |
| 3 | 0.048 | −12.458 | −0.024 | 0.160 |
| 4 | 0.064 | −12.433 | −0.024 | 0.160 |
| 5 | 0.080 | −12.409 | −0.024 | 0.160 |
| ~ | ~ | ~ | ~ | ~ |
| 100 | 1.775 | −10.070 | −0.028 | 0.225 |
| 101 | 1.797 | −10.042 | −0.028 | 0.227 |
| 102 | 1.820 | −10.013 | −0.029 | 0.228 |
| 103 | 1.843 | −9.985 | −0.029 | 0.230 |
| 104 | 1.866 | −9.956 | −0.029 | 0.231 |
| ~ | ~ | ~ | ~ | ~ |
| 160 | 3.444 | −8.150 | −0.036 | 0.341 |
| 161 | 3.478 | −8.114 | −0.036 | 0.343 |
| 162 | 3.512 | −8.078 | −0.036 | 0.346 |
| 163 | 3.547 | −8.042 | −0.036 | 0.348 |
| 164 | 3.582 | −8.006 | −0.036 | 0.350 |
| ~ | ~ | ~ | ~ | ~ |
| 395 | 99.850 | 5.228 | 0.001 | 0.320 |
| 996 | 99.882 | 5.228 | 0.001 | 0.310 |
| 997 | 99.913 | 5.227 | 0.001 | 0.301 |
| 998 | 99.943 | 5.227 | 0.001 | 0.291 |
| 999 | 99.972 | 5−226 | 0.001 | 0.281 |
| 1000 | 100.000 | 5.226 | | |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-124649, filed on Jul. 3, 2019 which is hereby incorporated by reference herein in its entirety.

What is claimed is:

1. A lens apparatus comprising:
an operation member that is rotatable by a user operation;
a zoom lens configured to perform zooming in accordance with a rotation of the operating member; and
a detector configured to divide an entire zoom range from a wide-angle end to a telephoto end, and detect a zoom position of the zoom lens; and
a memory storing distortion correction information corresponding to each zoom position of the zoom lens,
wherein, in a zoom range that satisfies the following condition:

Dist<−8.0, where Dist (%) is a distortion amount of the zoom lens,
the lens apparatus includes a zoom range in which a zoom position detecting resolution per unit rotational angle is the highest,
wherein, in a zoom range that satisfies the following condition:

Dist>0.0, the lens apparatus includes a zoom range in which the zoom position detecting resolution per unit rotational angle is the lowest, and
wherein the lens apparatus transmits zoom position information indicating a current zoom position and distortion correction information stored in the memory corresponding to the current zoom position to a camera.

2. The lens apparatus according to claim 1, wherein the following conditional expression is satisfied in the entire zoom range:

$$|DistA-DistB|<0.08,$$

where DistA is a distortion amount before the operation member is rotated and DistB is a distortion amount after the operation member is rotated by the rotational angle corresponding to a minimum resolution of the detector.

3. The lens apparatus according to claim 1, wherein the following conditional expression is satisfied:

$$N<1100,$$

where N is a maximum number of divisions of the entire zoom range by the detector.

4. The lens apparatus according to claim 1, wherein the following conditional expression is satisfied:

$$\theta>55,$$

where θ (degree) is a total rotational angle of the operation member in the entire zoom range.

5. The lens apparatus according to claim 1, wherein the detector detects a lens moving amount during zooming.

6. The lens apparatus according to claim 1, including a communicating interface that transmits the zoom position information and the distortion correction information to the camera.

7. The lens apparatus according to claim 1, wherein, in a zoom range that satisfies the following condition:

$$Dist<-9.0,$$

the lens apparatus includes the zoom range in which the zoom position detecting resolution per unit rotational angle is the highest.

8. The lens apparatus according to claim 1, wherein, in a zoom range that satisfies the following condition:

$$Dist<-10.0,$$

the lens apparatus includes the zoom range in which the zoom position detecting resolution per unit rotational angle is the highest.

9. The lens apparatus according to claim 1, wherein, in a zoom range that satisfies the following condition:

$$Dist>4.0,$$

the lens apparatus includes the zoom range in which the zoom position detecting resolution per unit rotational angle is the lowest.

10. An image pickup apparatus comprising:
a detachable lens apparatus comprising:
  an operation member that is rotatable by a user operation;
  a zoom lens configured to perform zooming in accordance with a rotation of the operating member; and
  a detector configured to divide an entire zoom range from a wide-angle end to a telephoto end, and detect a zoom position of the zoom lens; and
  a memory storing distortion correction information corresponding to each zoom position of the zoom lens,
wherein, in a zoom range that satisfies the following condition:

$$Dist<-8.0,$$

where Dist (%) is a distortion amount of the zoom lens,
  the detachable lens apparatus includes a zoom range in which a zoom position detecting resolution per unit rotational angle is the highest, and
wherein, in a zoom range that satisfies the following condition:

$$Dist>0.0,$$

the lens apparatus includes a zoom range in which the zoom position detecting resolution per unit rotational angle is the lowest;
an image sensor configured to receive light from the detachable lens apparatus;
a camera communicator configured to receive zoom position information indicating a current zoom position and distortion correction information stored in the memory of the detachable lens corresponding to the current zoom position from the detachable lens apparatus, in a state where the detachable lens apparatus is mounted to the image pickup apparatus; and
a processor configured to correct at least a distortion aberration of a capture image using the distortion correction information corresponding to the received current zoom position.

* * * * *